E. G. FRYKBERG.
Feed-Water Heaters and Condensers.

No. 153,764.   Patented Aug. 4, 1874.

WITNESSES:
A. Bennersdorf
C. Sedgwick

INVENTOR:
E. G. Frykberg
BY Munn & Co.
ATTORNEYS.

2 Sheets--Sheet 2.
E. G. FRYKBERG.
Feed-Water Heaters and Condensers.
No. 153,764. Patented Aug. 4, 1874.
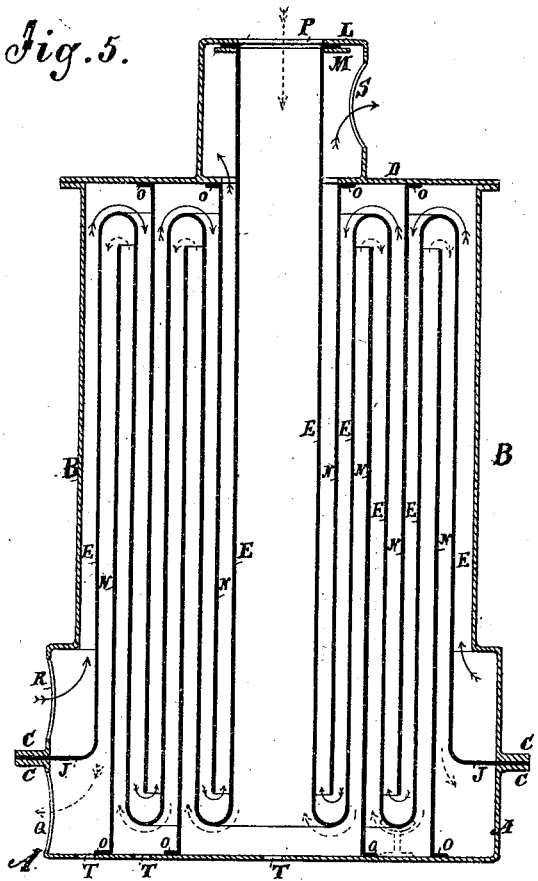
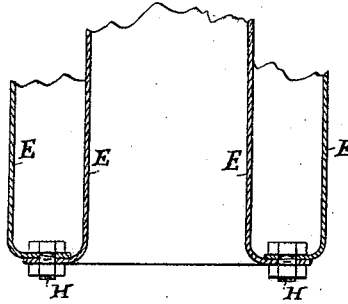
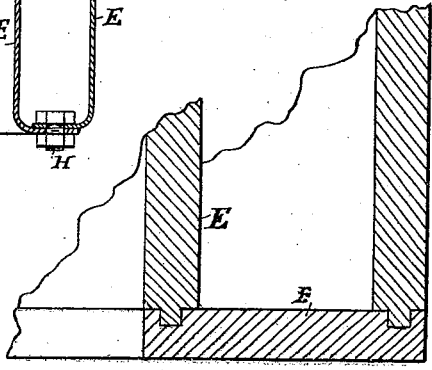
WITNESSES:
INVENTOR:
ATTORNEYS.

UNITED STATES PATENT OFFICE.

ERIK G. FRYKBERG, OF GILPIN'S POINT, MARYLAND.

IMPROVEMENT IN FEED-WATER HEATERS AND CONDENSERS.

Specification forming part of Letters Patent No. 153,764, dated August 4, 1874; application filed June 13, 1874.

*To all whom it may concern:*

Be it known that I, ERIK GUSTAF FRYKBERG, of Gilpin's Point, Caroline county, Maryland, have invented a new and useful Improvement in Feed-Water Heaters and Condensers, of which the following is a specification:

My invention relates to apparatus for heating or condensing or cooling steam, vapors, air, gases, or liquids; and it consists in the arrangement, hereinafter described, of separators and guiders for causing the contact of the opposing elements of heat and cold as the substance to be heated or cooled passes along the separators and guiders through the shell containing them.

Figure 1:
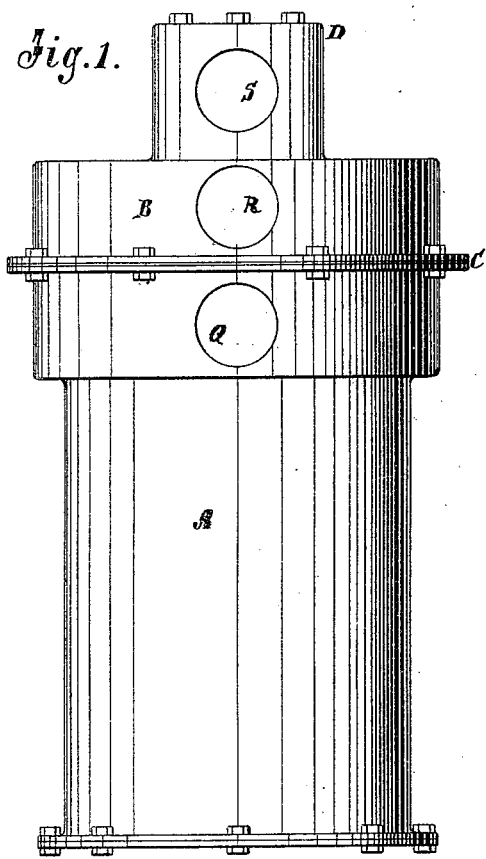
Figure 2:
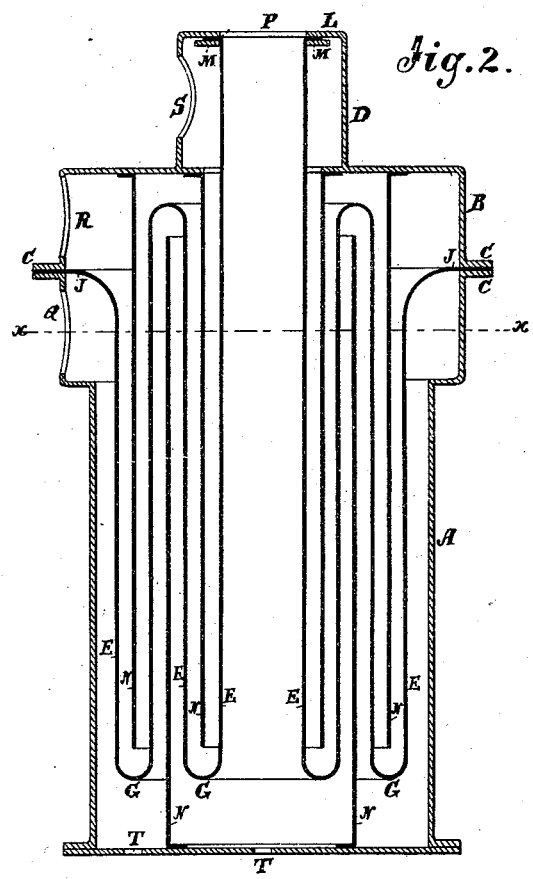
Figure 3:
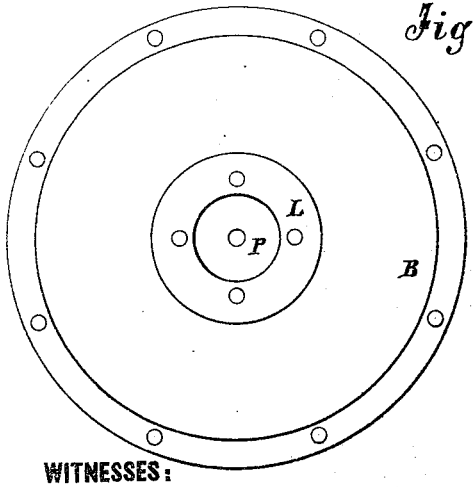
Figure 4:
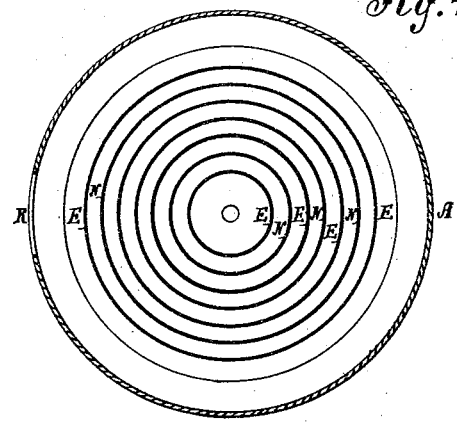

Figure 1 is a side elevation of my improved apparatus, having a cylindrical shape. Fig. 2 is a sectional elevation. Fig. 3 is a top view. Fig. 4 is a horizontal section taken on the line $x$ $x$, Fig. 2. Fig. 5 is a sectional elevation, showing a modification of the arrangement; and Figs. 6, 7, and 8 are detail sections, showing modifications of the construction for joining the parts of the separator.

A and B represent the shell, which may be made in two parts, as shown, with flange C for bolting them together, the part A having its end closed by a head, D, bolted on the head of the part B. E represents the separating parts, and N the guiding parts controlling the steam, air, gases, or liquids to be passed through the apparatus. The separator consists of a series of sufficient large pipes or canals placed into and fixed to each other at the ends by doubling, binding, lapping, soldering, or welding the arc of different sizes and shorter than the shell. One end of the series has a flange, J, on it, and is clamped between the two parts of the shell at the flanges C, and the other end is bolted to the end of the tubular extension D by a flange, L, and a washer or collar, M. The guiding part consists of a series of hollow cases, N, bolted or fixed properly to both ends of the shell arranged in the spaces between the different parts of the separator.

By a larger apparatus, for strengthening the different parts thereof, the shell, the separator, and the guider may be provided with suitable flanges or laps, and the separator can be supported by stays or props.

T represents holes in the bottom of the shell for drawing off the products of condensation.

The matter to be considered—say, steam—may be let in at P and out at Q, and the cooling medium—say, water—may be let in at R and out at S; but they may be let in and out in the reverse order, or they may change sides of guiders and separators.

The apparatus can be made of any proper material—say, copper, or iron, or clay, or plumbago—and may be constructed either cylindrical, as shown by the drawings, or prismatical, or of any other convenient form, and will be very efficient and cheap.

Having thus described my invention, I claim as new and desire to secure by Letters Patent—

The combination, with the heads of shell A B, of the multiple guiders N, having turned flange J, and the separators E, all constructed and arranged substantially as and for the purpose described.

ERIK GUSTAF FRYKBERG.

Witnesses:
POLIT. J. JUMP,
THOMAS MELVIN.